(No Model.)
S. KESNER.
MEAT TENDERER.
No. 311,901. Patented Feb. 10, 1885.
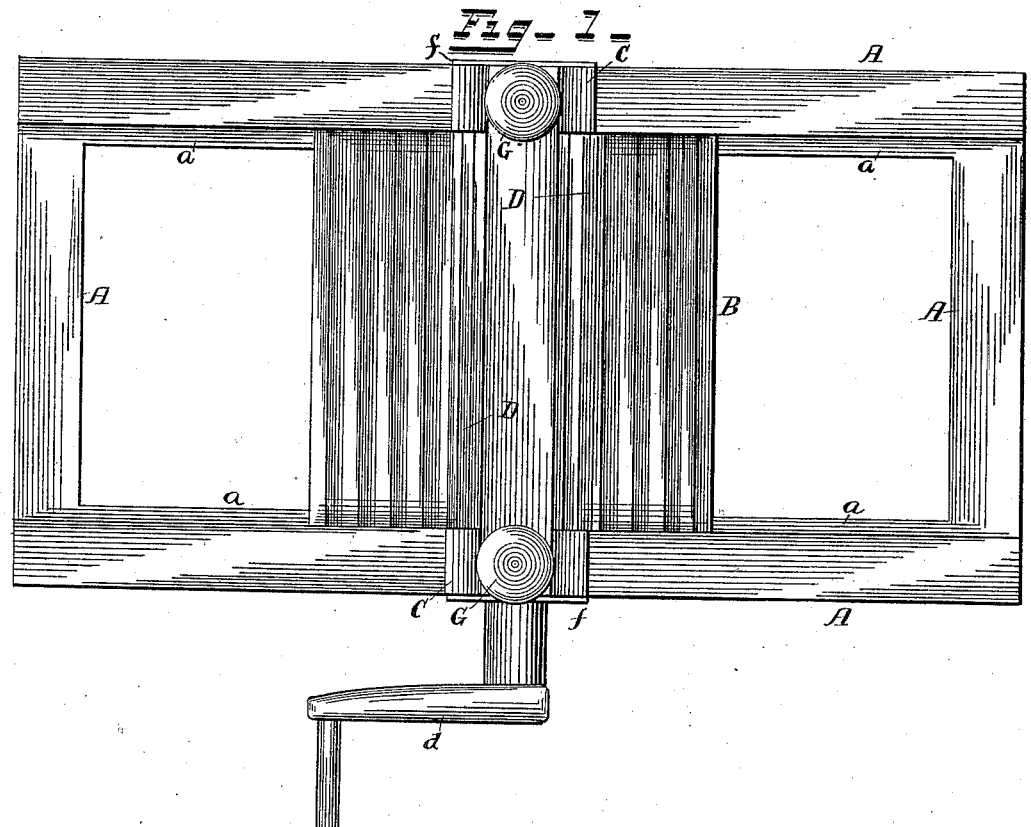
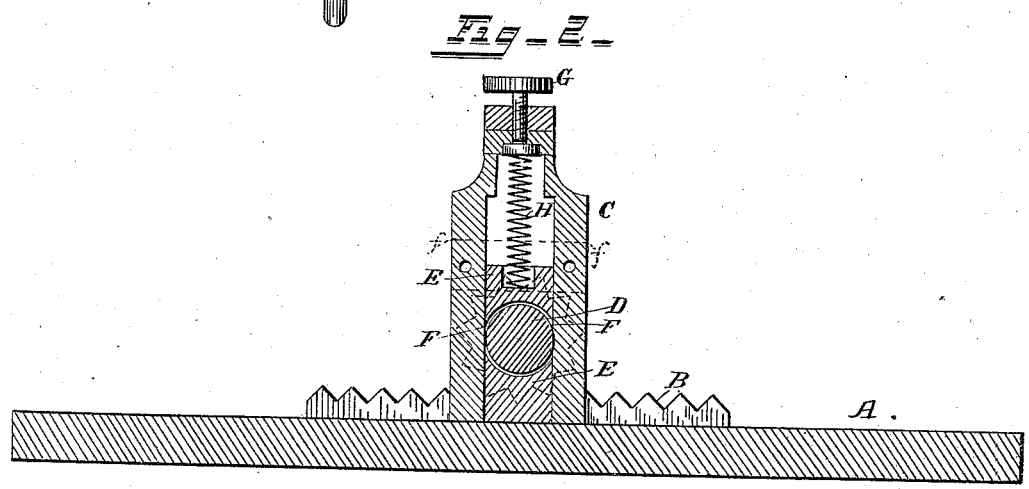
WITNESSES:
W. T. Robertson.
M. J. Johnston.
INVENTOR
Solomon Kesner
BY
Edw. J. Underwood
ATTORNEY.
N. PETERS. Photo-Lithographer, Washington, D. C.

UNITED STATES PATENT OFFICE.

SOLOMON KESNER, OF LIBERTY, WOODSON COUNTY, KANSAS.

MEAT-TENDERER.

SPECIFICATION forming part of Letters Patent No. 311,901, dated February 10, 1885.

Application filed January 31, 1884. (No model.)

*To all whom it may concern:*

Be it known that I, SOLOMON KESNER, a citizen of the United States, residing at Liberty township, in the county of Woodson and State of Kansas, have invented certain new and useful Improvements in a Meat-Tenderer; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to meat-tenderers; and it consists in certain improvements, to be hereinafter more fully described in the specification and pointed out in the claims. Its object is to remedy a defect found in other and similar meat-tenderers, which are liable to become clogged and stopped if a bone or other obstruction is encountered in the passage of the meat through the same.

In the drawings, Figure 1 is a top view of my device, and Fig. 2 is a vertical section on the line of one of the standards.

A is a frame, consisting of a flat iron bed-plate, having within a rectangular opening with flanges $a$ at the sides to receive the plate B, which slides on the flanges, and has its upper surface provided with a series of flutings or corrugations, which cross it at right angles to its length and engage with a roller. At each side of the middle of the bed-plate rise standards C, in which are journaled the ends of the corrugated roller D, arranged to mesh with the flutings on the sliding plate and move it along back and forth on the flanges of the bed-plate. This roller D has at one end a crank, $d$, by which it is revolved, and the ends of the roller are received in journal-boxes E, which move up and down in ways F in the standards, and are held in place by plates $f$ at the outsides of the standards, and are held down by thumb-screws G, passing through the tops of the standards, which screws are attached to and press upon stiff spiral springs secured to the journal-boxes E of the roller. The tops of the standards are connected by a cross-bar. The meat is laid on the sliding plate and the crank turned, which draws the meat between the plate and roller backward and forward as often as is required to crush the fiber and render the meat tender. If desired, the meat may be turned half round on the sliding plate, so that it will pass through the machine and the fiber be crushed at right angles to the former operation.

I am aware that heretofore machines for fluting and ironing fabrics have been constructed closely resembling in superficial structure my device, but not adapted for the purpose of tendering meat, and hence I do not broadly claim the combination of a metallic corrugated bed-plate with a corrugated roller engaging therewith, in connection with a spring to keep these parts normally in contact, and I am also aware that meat-tenderers have heretofore been made with sliding beds and fluted rollers, and also with means for permitting these parts to yield automatically, and such described constructions I do not broadly claim.

Having thus fully described my invention, I claim—

In a meat-tendering device, the combination of the bed-plate A, consisting of a rectangular open metallic frame having interior flanges, $a$, on the side bars, forming grooves, with the sliding plate B, adapted to move within said grooves, and corrugated on its entire upper surface, the open standards C at opposite sides of the bed-plate, containing sliding journal-boxes E, each connected with an independent thumb-screw, G, whose shank extends through the top of the standard by the spiral spring H, and having plates $f$ on the outer surfaces of said standards, and the corrugated roller D, with crank $d$, all arranged and adapted to operate substantially as set forth.

In testimony whereof I affix my signature in presence of two witnesses.

SOLOMON KESNER.

Witnesses:
M. C. SMITH,
W. P. TAYLOR.